(12) United States Patent
Newnham et al.

(10) Patent No.: US 11,803,344 B2
(45) Date of Patent: Oct. 31, 2023

(54) REMOTELY MONITORABLE AND OPERATABLE DISPLAY ASSEMBLIES, SYSTEMS AND METHODS FOR THE SAME

(71) Applicant: Manufacturing Resources International, Inc., Alpharetta, GA (US)

(72) Inventors: Elliott Newnham, Alpharetta, GA (US); Brock Bearchell, Alpharetta, GA (US); William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 107 days.

(21) Appl. No.: 17/974,309

(22) Filed: Oct. 26, 2022

(65) Prior Publication Data

US 2023/0052966 A1    Feb. 16, 2023

Related U.S. Application Data

(63) Continuation-in-part of application No. 17/893,253, filed on Aug. 23, 2022, which is a continuation of application No. 17/548,698, filed on Dec. 13, 2021, now Pat. No. 11,455,138, which is a continuation of application No. 17/134,634, filed on Dec. 28, 2020, now Pat. No. 11,243,733, which is a continuation of application No. 16/508,877, filed on Jul. 11, 2019, now Pat. No. 10,908,863.

(60) Provisional application No. 62/697,016, filed on Jul. 12, 2018.

(51) Int. Cl.
*G06F 3/14* (2006.01)
*H04L 43/06* (2022.01)

(52) U.S. Cl.
CPC .................... *G06F 3/14* (2013.01); *H04L 43/06* (2013.01)

(58) Field of Classification Search
CPC ..... G06F 3/04883; G06F 3/04845; G06F 3/20; G06K 9/222; G06F 3/14; H04L 43/06
USPC ......................................................... 345/2.1
See application file for complete search history.

(56) References Cited

U.S. PATENT DOCUMENTS

| | | | | |
|---|---|---|---|---|
| 10,593,175 | B1* | 3/2020 | Jennings et al. | G08B 13/19641 |
| 2011/0283199 | A1* | 11/2011 | Schuch et al. | H04N 21/6582 |
| | | | | 715/740 |
| 2013/0282154 | A1* | 10/2013 | Chappell et al. | G08G 1/095 |
| | | | | 700/90 |
| 2018/0181091 | A1* | 6/2018 | Funk et al. | G08G 1/133 |

* cited by examiner

*Primary Examiner* — Mark Edwards
(74) *Attorney, Agent, or Firm* — STANDLEY LAW GROUP LLP; Jeffrey S. Standley; Adam J. Smith

(57) ABSTRACT

Display assemblies, systems, and methods for remote monitoring of display assemblies are provided. The display assemblies each include a network connection device in electronic communication with a controller in electronic communication with one or more electronic displays and components for operation. A monitoring center receives data from the display assemblies regarding operation, associates different customer identifiers with different portions of the received data, receives a particular customer identifier from a customer device, and electronically identifies the portions of the data associated with the particular customer identifier for transmission to the customer device.

20 Claims, 16 Drawing Sheets

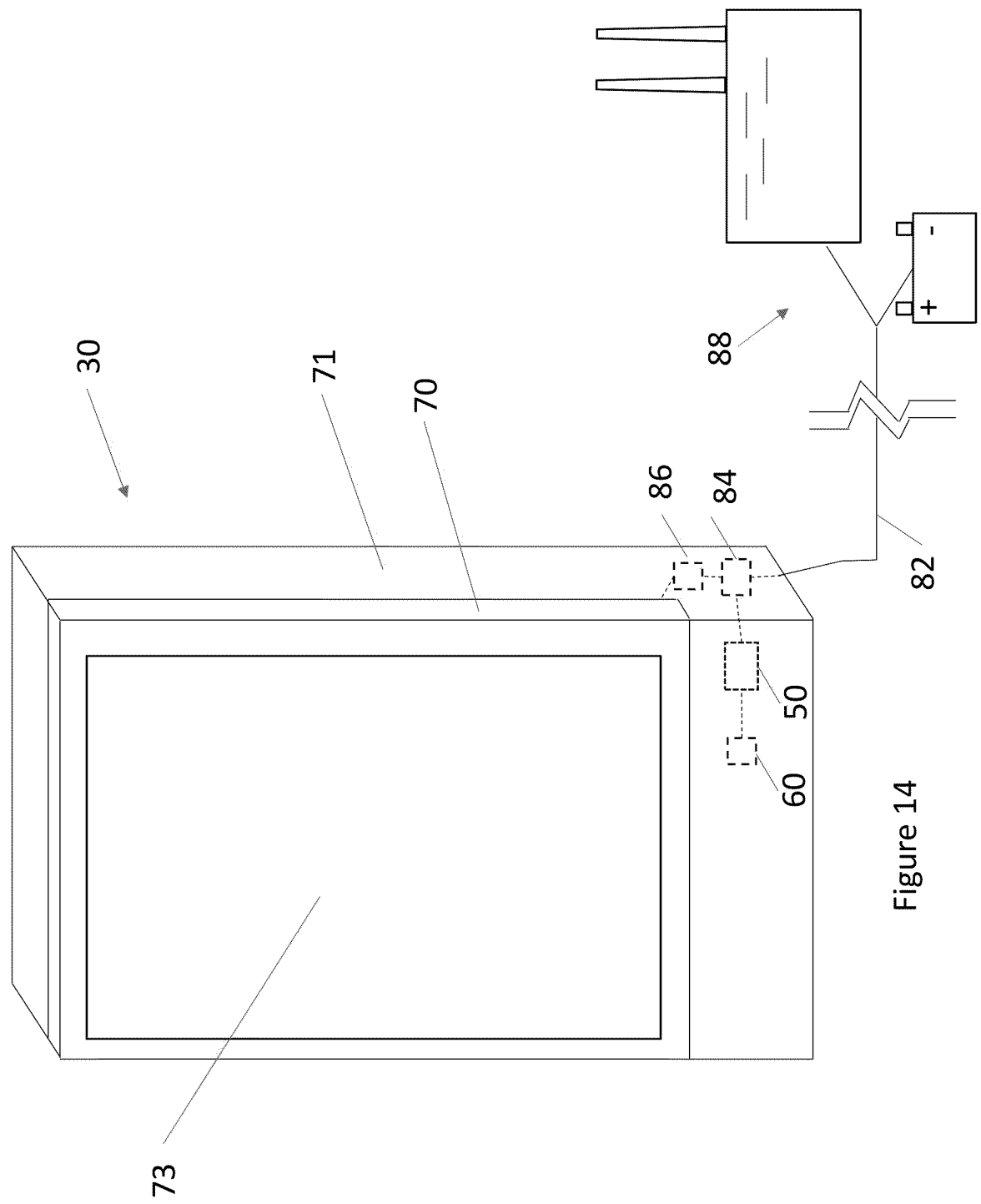

Figure 17

REMOTELY MONITORABLE AND OPERATABLE DISPLAY ASSEMBLIES, SYSTEMS AND METHODS FOR THE SAME

CROSS-REFERENCE TO RELATED APPLICATION

This application is a continuation-in-part of U.S. Application No. 17/893,253 filed Aug. 23, 2022, which is a continuation of U.S. Application No. 17/548,698 filed Dec. 13, 2021, which is a continuation of U.S. Application No. 17/134,634 filed Dec. 28, 2020, which is a continuation of U.S. Application No. 16/508,877 filed Jul. 11, 2019, which claims the benefit of U.S. Provisional Application No. 62/697,016 filed Jul. 12, 2018, the disclosure of each of which are hereby incorporated by reference as if fully restated herein.

TECHNICAL FIELD

Exemplary embodiments relate generally to remotely monitorable and operatable display assemblies, such as those incorporating one or more electronic displays, as well as systems and methods for the same.

BACKGROUND AND SUMMARY OF THE INVENTION

The use of electronic displays has increased in recent years. Beyond personal use, these electronic displays are sometimes placed in an enclosure, which may be ruggedized, for both indoor and/or outdoor use. For example, without limitation, such display assemblies may be placed outdoors, such as on sidewalks or on the tops of vehicles to name some examples, to display advertisements or other information. Oftentimes these display assemblies are associated with other electronic equipment to provide features such as, but not limited to, video conferencing, web browsing, way finding, image capture, emergency notification, and the like. It is desirable to provide owners, manufactures, operators, renters, or the like of such display assemblies with access to operations data regarding the status and operation of such display assemblies. Furthermore, these display assemblies consume a significant amount of power during operation. A significant amount of the energy consumption of such display assemblies comes from operation of the backlight. Particularly as the use of such display assemblies has increased, it is desirable that such operations data include data regarding the energy consumption of the display, including but not limited to, status and operation of the backlight. Such operations data may be stored and presented to display owners and other relevant parties such that energy consumption and reliability may be tracked. Certain operations parameters may be adjusted in response to the presented data. For example, without limitation, backlight levels may be adjusted downward to reduce energy consumption or maintenance frequencies may be increased in response to reported display assembly downtime.

However, for many such display assemblies, multiple parties may have an interest in the operations data. For example, a display assembly manufacturer may have an interest in monitoring its tens, hundreds, thousands, tens of thousands, etc. of display assemblies. Each owner or renter of one or more such display assemblies might likewise have an interest in monitoring the display assemblies it owns. While the manufacturer may already have access to this operations data, the operations data may include data for all owners or renters. Thus, the operations data may be co-located with operations data for other owners or renters. Allowing complete access to such data may create privacy concerns. However, individual storage of each client's information would potentially require multiple storage devices, increasing complexity and expense. Therefore, what is needed is a system and method for providing access to co-located operations data for a display assembly.

The present disclosures provide a system and method for providing access to co-located operations data for a display assembly. The system may comprise one or more client devices in communication with a centralized monitoring center via a network. Multiple display assemblies may likewise be in communication with the monitoring center via the network. In exemplary embodiments, each display assembly comprises one or more electronic displays and other electronic components for operation of the display assembly in electrical connection with a display controller. The display controller may likewise be in electrical connection with a network interface device. The network interface device may likewise be in communication with the centralized monitoring center via the network.

Operations data may be continually gathered and transmitted to the central monitoring center for storage. The received operations data may be processed. Such processing may determine which client(s) are associated with the operations data and what the operations data represents. The operations data may be summarized and presented in a visual depiction. Upon receipt of a client request for operations information, client specific information may be retrieved and presented to the client in the visual depiction. In other exemplary embodiments, upon login, a client may be permitted to remotely operate or modify display assemblies associated with the client.

Remote monitoring and/or operation of display assemblies may permit display owners, operators, users, or the like to monitor display assembly status and/or exert operational control over the same from various locations. In exemplary embodiments, without limitation, some or all of the display assemblies may include latches, locking devices, and/or switches which are remotely monitorable and/or operable, such as to monitor whether portions of the display assemblies, such as but not limited to access panels and/or electronic displays, are in an opened and/or closed position, locked and/or unlocked positions, and/or permit remote locking and/or unlocking of the same and/or movement between the opened and/or closed positions. Such switches may include micro-switches, though such is not necessarily required.

Various data points may be remotely monitored and/or adjusted. Such data points may include, for example without limitation, sensor information, settings, operational parameters, user preferences, operation information, status information, combinations thereof, or the like. Any number and/or type of data points may be monitored and/or adjusted such as but not limited to, day brightness level, night brightness level, brightness transition day-night-day, autonomous peripheral power cycling under what conditions, autonomous media player reboots under what conditions, combinations thereof, or the like.

For example, without limitation, such data points may include whether each electronic display and/or latching and/or locking device for the same is in the opened and/or closed position, locked and/or unlocked positions, such as but not limited to, based on data received from the latches, locking devices, and/or switches.

Alternatively, or additionally, such data points may include power limits. These may include, by way of non-limiting example, AC power input limits. For example, without limitation, a maximum power input setting may be adjusted or set to a level below a trip limit of one or more circuit breakers for the display assembly. The circuit breakers may be integrated with the display assembly, external thereto, or otherwise. The controller may be configured to monitor power consumption, and where the power consumption approaches, reaches, or exceeds the maximum power input setting, the controller may be configured to automatically adjust display assembly operations, such as to reduce power consumption. For example, without limitation, luminance settings may be decreased, fan speed may be decreased, combinations thereof, or the like. This may assist with preventing or limiting nuisance trips of power breakers.

The various data points may be remotely monitored and/or updated. The data points may be filtered, such as for viewing or updating, based on various display assembly characteristics, user preferences, type or kind of data point, time associated with data point, combinations thereof, or the like. The display assembly characteristics may include, but are not necessarily limited to, deployed geographic region (e.g., zip code, city, within distance from particular location, state, province, country, address, navigational coordinates, combinations thereof, or the like), part number, unit serial number, fleet identifier, customer identifier, advertisement identifier, combinations thereof, or the like.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 14 is a front perspective view of another exemplary display assembly and related components for use with at least the system of FIG. 1 and the method of FIG. 13;

FIG. 17 is a plan view of an exemplary report generatable by at least the system of FIGS. 1 and 12A-12B and the method of FIG. 15.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
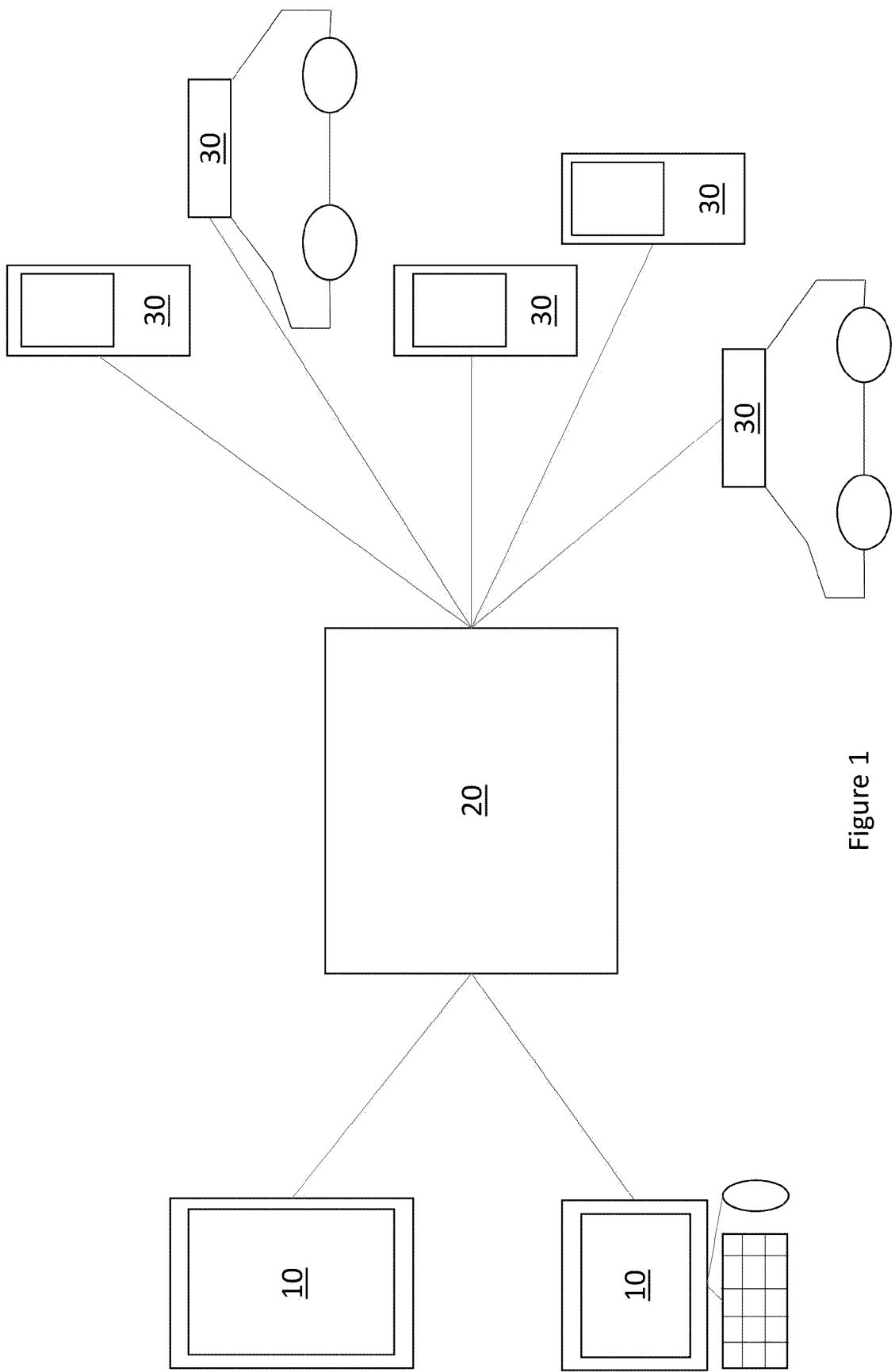
FIG. 1 is a simplified plan view of an exemplary system.

FIG. 1 is a simplified block diagram of an exemplary system. A number of display assemblies 30 may be in communication with a monitoring center 20. Similarly, a number of client devices 10 may be in communication with the monitoring center 20. The display assemblies 30 may be located remote from the monitoring center 20. Likewise, the client devices 10 may be located remote from the monitoring center 20. The communication between the display assemblies 30, the monitoring center 20, and the client devices 10 may be made by way of a network 80. The network 80 may be any network such as a cellular network, internet, intranet, world wide web, or the like. The network 80 between the client devices 10 and the monitoring center 20 may be the same or may be different from the network 80 between the monitoring center 20 and the display assemblies 30.

Each of the display assemblies 30 may be any kind of display assembly 30, such as but not limited to, a free-standing display kiosk configured for placement on a sidewalk, a wall-mounted display unit, a vehicle topper unit, or the like. Each of the client devices 10 may be a personal electronic device such as, but not limited to, a smartphone, tablet, smartwatch, laptop, desktop computer, some combination thereof, or the like.

Figure 2:
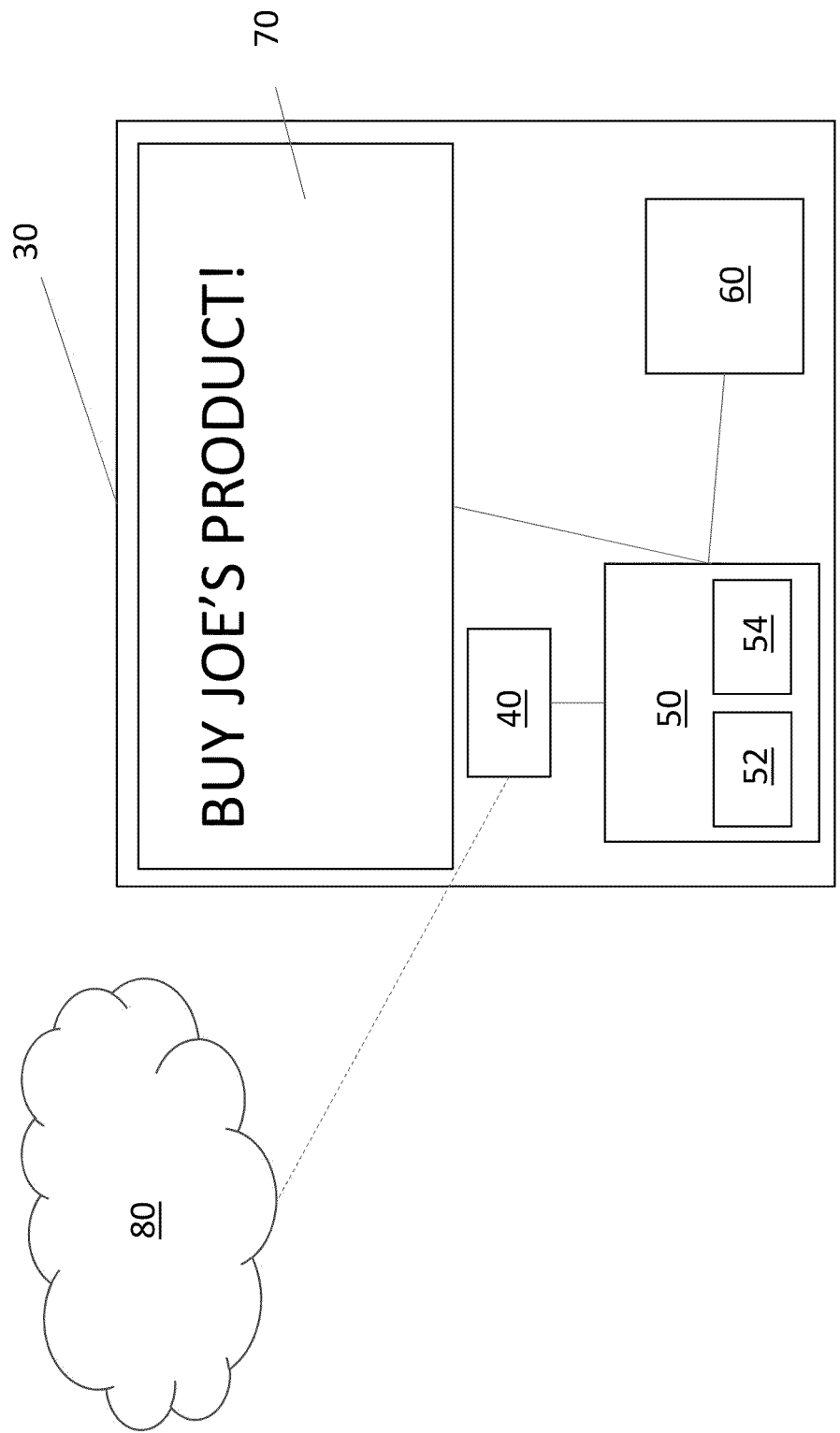
FIG. 2 is a detailed view of an exemplary display assembly of FIG. 1.

FIG. 2 is a detailed view of an exemplary display assembly 30 of FIG. 1. Each display assembly 30 may comprise one or more electronic displays 70 in electrical connection with a display controller 50. Each electronic display 70 may comprise a backlight for illuminating the electronic display 70. The electronic display 70 may comprise one or more a liquid crystal displays, light emitting diode ("LED") displays, organic LED displays, plasma displays, some combination thereof, or the like. One or more of the electronic displays 70 may comprise touch capabilities. The backlight may be comprised of a number of LEDs arranged in a directly backlit, edge-lit, or other orientation.

In exemplary embodiments, the display controller 50 may be in electrical connection with other components 60 for operating the display assembly 30. Such components 60 may include, but are not limited to, fans, temperature sensors, light sensors, fan speed sensors, power consumption sensors, air quality sensors, weather sensors, other sensors, telephone equipment, video conferencing equipment, voice-over-internet-protocol (VOIP) equipment, touch screens, camera, microphones, emergency notification devices, processors, electronic storage devices, wayfinding equipment, location detection devices, video players, proof of play devices, and the like. Any number, combination, and/or type of components are contemplated.

The display controller 50 may be configured to gather operations data from the electronic display 70. The display controller 50 may, alternatively or additionally, be configured to gather operations data from the components 60. Such operations data may include, but is not limited to, proof of play data, fan speed data, temperature data, humidity data, power consumption data, ambient light data, weather data, backlight data, electronic display data, status data, emergency notification data, air quality data, sensor readings, camera images or video recordings, microphone audio recordings, use history, and the like. The operations data for multiple clients may be co-located at the electronic storage device 52 located at the display assembly 30. Portions of the operations data may be associated with one or more client identifiers. For example, without limitation, operations data associated with a particular image displayed on the electronic display 70 may be associated with a particular client identifier. Alternatively, or in addition, all operations data originating from one or more display assemblies 30 may be associated with one or more client identifiers. This may permit for specific clients to access and retrieve only the operations data associated with the particular client – permitting the co-location of such operations data while maintaining privacy. The association with a client identifier may be performed at the display assembly 30 or at the monitoring center 20. The client identifiers may be, without limitation, unique alphanumeric serial numbers.

The display controller 50 may be in electrical communication with a network connection device 40. The network connection device 40 may be configured to transmit information to the monitoring center 20, including but not limited to, the operations data. In exemplary embodiments, the network connection device 40 may likewise be configured to receive information from the monitoring center 20, including but not limited to, operation instructions. Such operations instructions may comprise remote login capabilities, remote viewing, fan speed instructions, backlight adjustment instructions, video or image files for display on the electronic displays 70, some combination thereof, or other instructions for operation of the display assembly 30. The network connection device 40 may transmit and/or receive such information by way of the network 80.

The display controller 50 may comprise an electronic storage device 52 for storing the operations data and/or operations instructions. The display controller 50 may also comprise a processor 54 for processing the operations data and/or operations instructions. The electronic storage device 52 may comprise software instructions, which when executed, configure the processor 54 to perform various steps and processes described herein.

Figure 3:
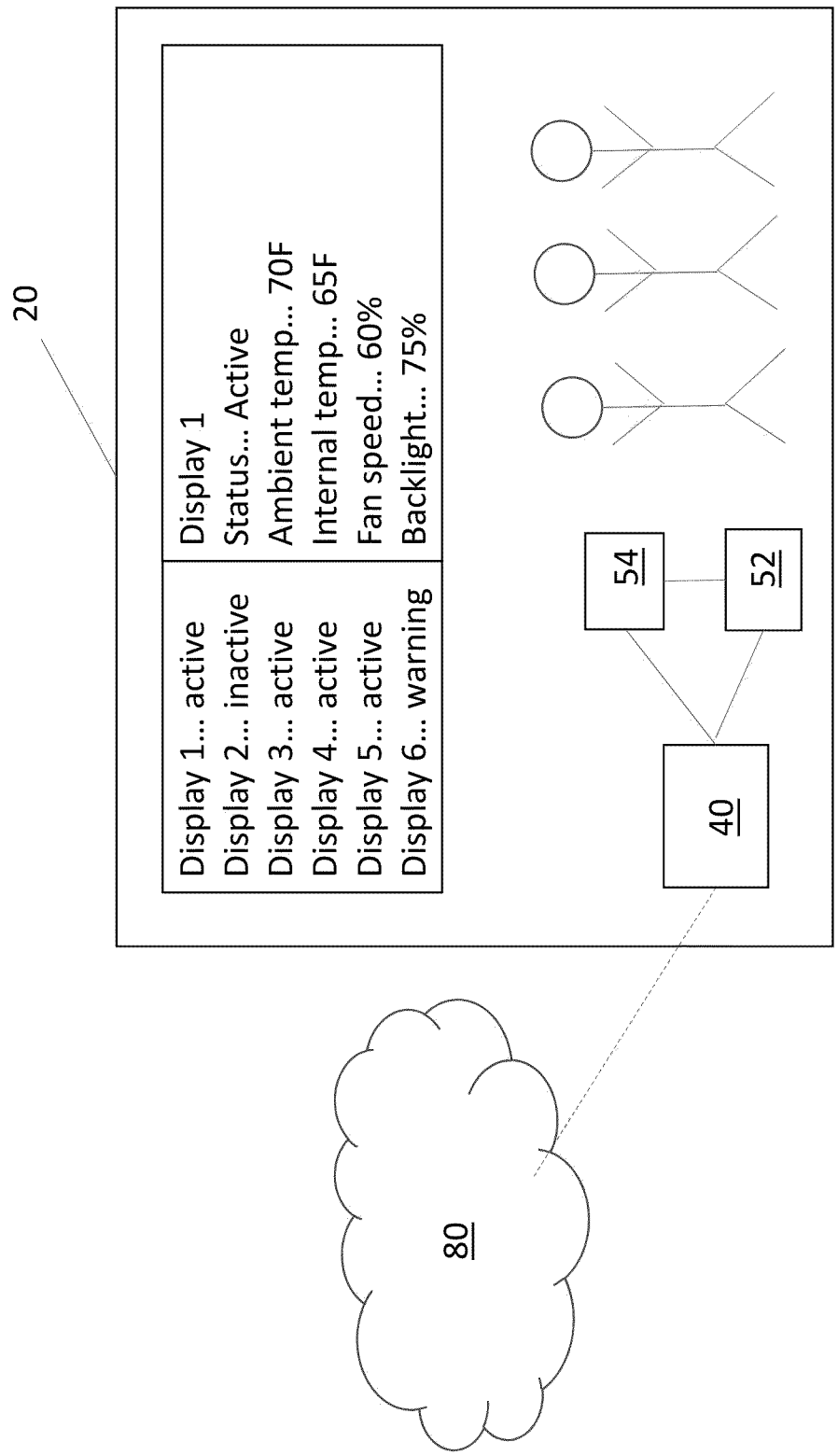
FIG. 3 is a detailed view of an exemplary monitoring center of FIG. 1.

FIG. 3 is a detailed view of an exemplary monitoring center 20 of FIG. 1. The monitoring center 20 may comprise an electronic storage device 52 for storing the operations data and/or operations instructions. The monitoring center 20 may also comprise a processor 54 for processing the operations data and/or operations instructions. The electronic storage device 52 may comprise software instructions, which when executed, configure the processor 54 to perform various steps and processes described herein. The processor 54 may be the same or different from the processor 54 of the display assembly 30.

The monitoring center 20 may further comprise a network connection device 40. The network connection device 40 may be in electrical communication with the processor 54 and the electronic storage device 52. The network connection device 40 may be in electrical communication with one or more of the display assemblies 30. The network connection device 40 may be configured to receive operations data from the one or more display assemblies 30. The network connection device 40 may also be configured to transmit operations instructions to one or more of the display assemblies 30.

The network connection device 40 may be receive the operations data and pass it to the electronic storage device 52 for storage. The operations data for multiple display assemblies 30 may be co-located at the electronic storage device 52 located at the monitoring center 20. Co-location may be accomplished by associating portions of the operations data with one or more client identifiers. Each portion of the operations data associated with a particular client identifier may be stored on a common electronic storage device 52, but electronically partitioned to ensure that the operations data associated with each particular client is maintained separate.

Alternatively, or in addition, all operations data originating from one or more display assemblies 30 may be associated with one or more client identifiers. This may permit for specific clients to access and retrieve only the operations data associated with the particular client - permitting the co-location of such operations data while maintaining privacy. The network connection device 40 may transmit and/or receive such operations data and/or operations instructions by way of the network 80.

The gathering, transmitting, storing, receiving, and retrieving of operations data and/or operations instructions as shown and described herein may be accomplished, wholly or in part, by the use of a microservices architecture. Any of the other steps or methods described herein may likewise be accomplished, wholly or in part, by the use of a microservices architecture.

The monitoring center 20 may be a brick-and-mortar location staffed with a number of monitoring personnel, though such is not required. In exemplary embodiments, the monitoring center 20 may comprise one or more rooms with one or more displays which may provide status and/or operations information for one or more display assemblies 30. For example, without limitation, a complete or partial list of display assemblies 30 and status information for each display assembly 30 may be shown. Information for a subset of display assemblies 30 may be shown in a rotating, scrolling, or other fashion. Detailed information regarding one or more display assemblies 30 may be shown on the same or a separate screen. A number of personal electronic devices, such as but not limited to, smartphone, tablet, smartwatch, laptop, desktop computer, some combination thereof, or the like may likewise display some or all of the information and may be configured to receive user input comprising operational instructions for one or more of the display assemblies 30.

Figure 4:
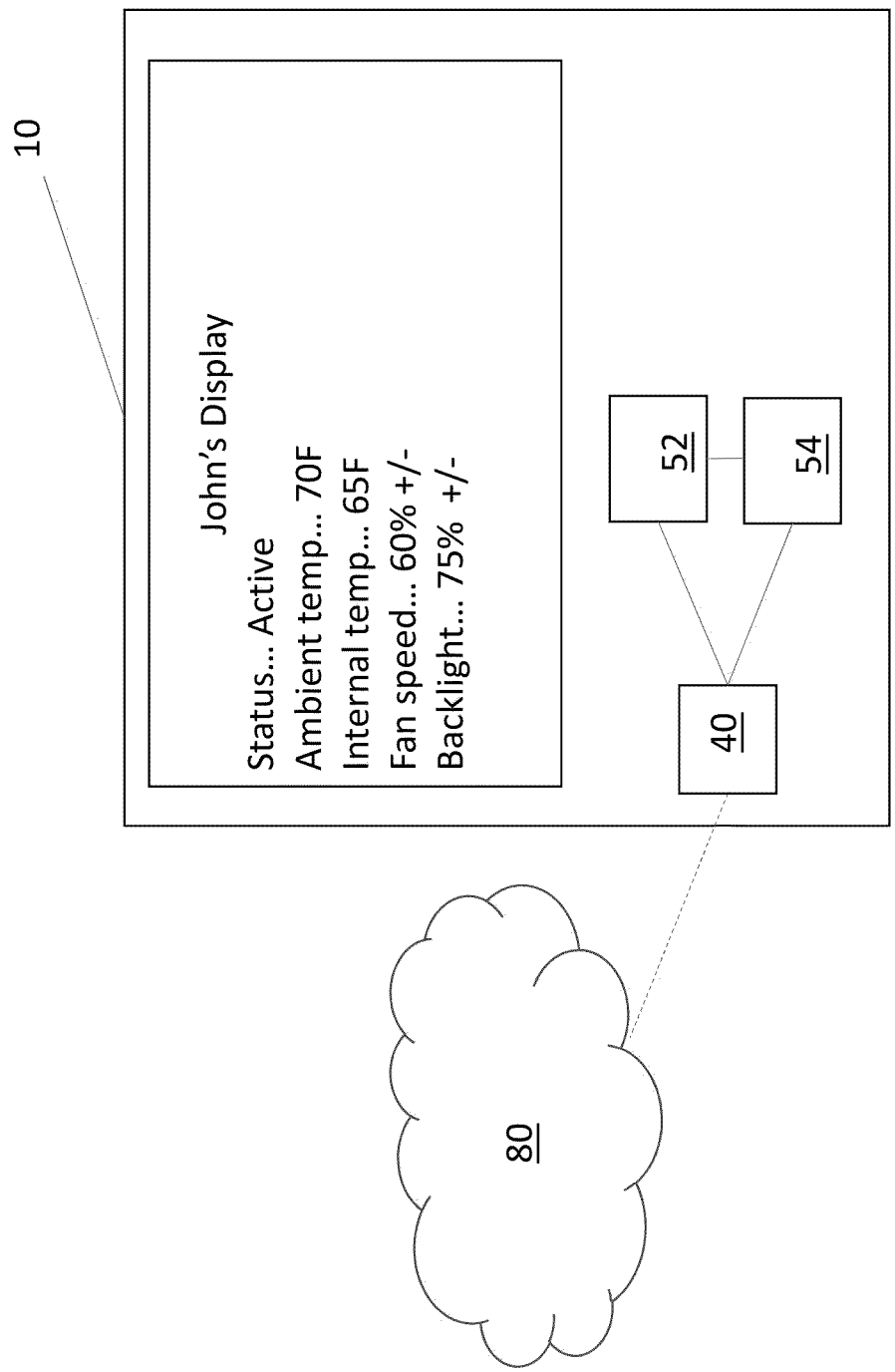
FIG. 4 is a detailed view of an exemplary client device of FIG. 1.

FIG. 4 is a detailed view of an exemplary client device 10 of FIG. 1. The client device 10 may be any personal electronic device, including but not limited to, a smartphone, tablet, smart watch, laptop, desktop computer, some combination thereof, or the like. The client device 10 may comprise an electronic storage device 52 for storing the operations data and/or operations instructions. The client device 10 may also comprise a processor 54 for processing the operations data and/or operations instructions. The electronic storage device 52 may comprise software instructions, which when executed, configure the processor 54 to perform various steps and processes described herein. The processor 54 may be the same or different from the processor 54 of the client device 10.

The client device 10 may further comprise a network connection device 40. The network connection device 40 may be in electrical communication with the processor 54 and the electronic storage device 52. The network connection device 40 may be in electrical communication with the monitoring center 20. The network connection device 40 may be configured to receive operations data from the one or more display assemblies 30 by way of the monitoring center 20. In exemplary embodiments, the network connection device 40 may be receive such operations data and store it on the electronic storage device 52. The network connection device 40 may be configured to transmit operations instructions to the monitoring center 20. The network connection device 40 may transmit and/or receive such information by way of the network 80. In exemplary embodiments, the receipt of operations data and/or transmission of operations instructions is accomplished by use of an internet browsing application and an internet-based user interface or report 90.

Figure 5:
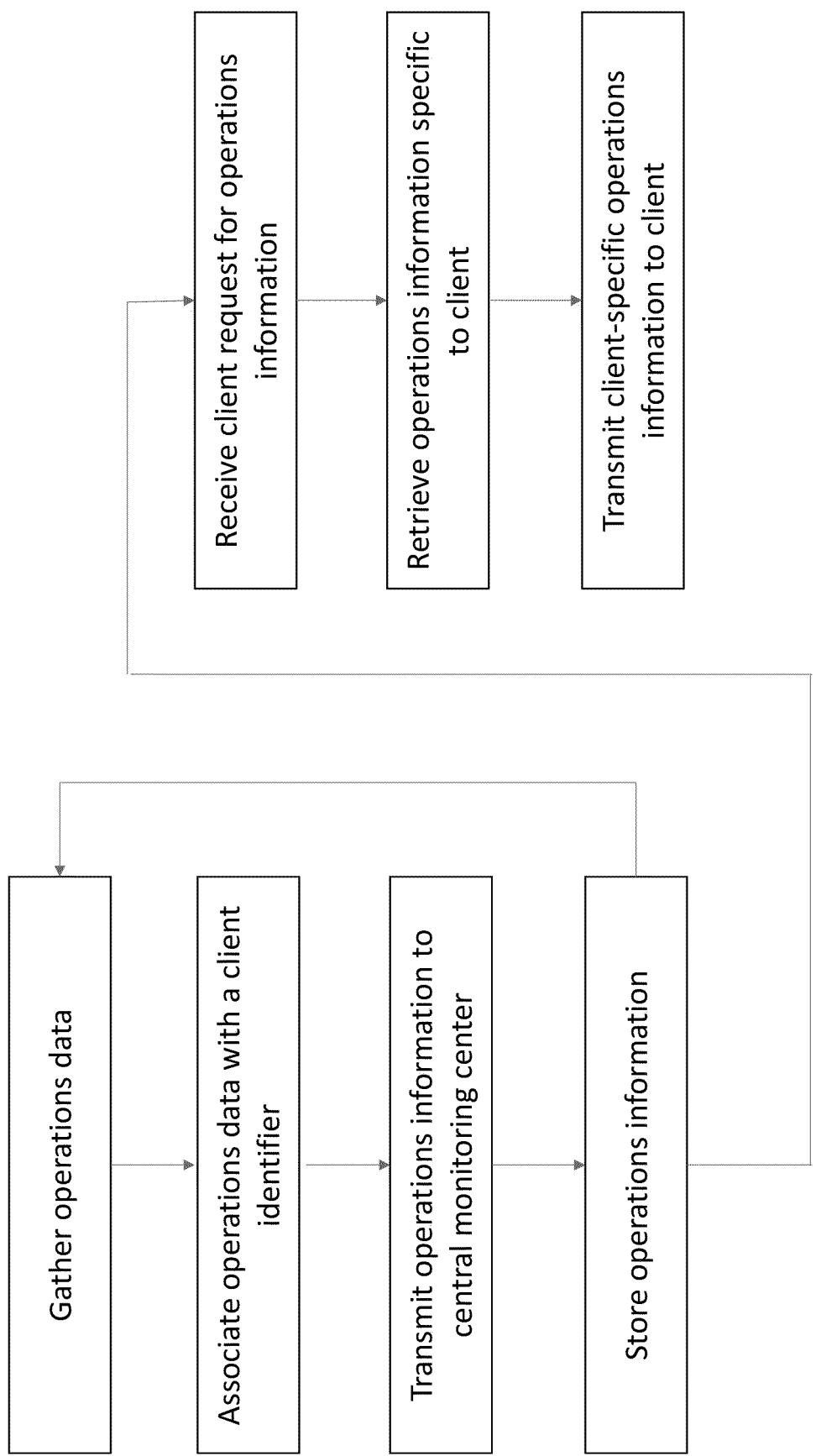
FIG. 5 is a flow chart of exemplary logic for use with the system of FIG. 1.

FIG. 5 is a flow chart of exemplary logic for use with the system of FIG. 1. The display controller 50 may gather operations data the one or more electronic displays 70 and/or the other components 60 of the respective display assembly 30. The operations data may be associated with one or more client identifiers. This operations data may be stored on the electronic storage device 52 of the respective display assembly 30. The operations data may be transmitted by way of the network connection device 40 and the network 80 to the monitoring center 20 where it may be stored on one or more electronic storage devices 52 at the monitoring center 20. In exemplary embodiments, the processor 54 at the monitoring center 20 may associate the operations data with one or more client identifiers. The processor 54 may electronically partition the electronic storage device 52 such that operations data associated with each particular client identifier is kept separate from operations data associated with other client identifiers. This process may be repeated continuously or at any interval. Alternatively, or in addition, a client identifier may be associated with the operations data when transmitted to the monitoring center 20.

A client request for operations data may be received from one or more of the client devices 10 at the monitoring center 20. The monitoring center 20 may retrieve the operations data associated with the client. In exemplary embodiments, this may involve retrieving all operations data associated with one or more of the display assemblies 30 associated with the client. Alternatively, or in addition, operations data specific to the client from a particular display assembly 30 may be retrieved. Stated another way, any single display assembly 30 may comprise operations data for multiple clients and only the operations data specific to the particular client may be retrieved. The retrieved operations data specific to the client may then be transmitted to the appropriate client device(s) 10. In exemplary embodiments, data specific to the client may be identified by way of the client identifiers. Operations data may be requested from each electronic display assembly 30 periodically, continuously, sequentially, in a particular order, some combination thereof, or the like.

Figure 6:
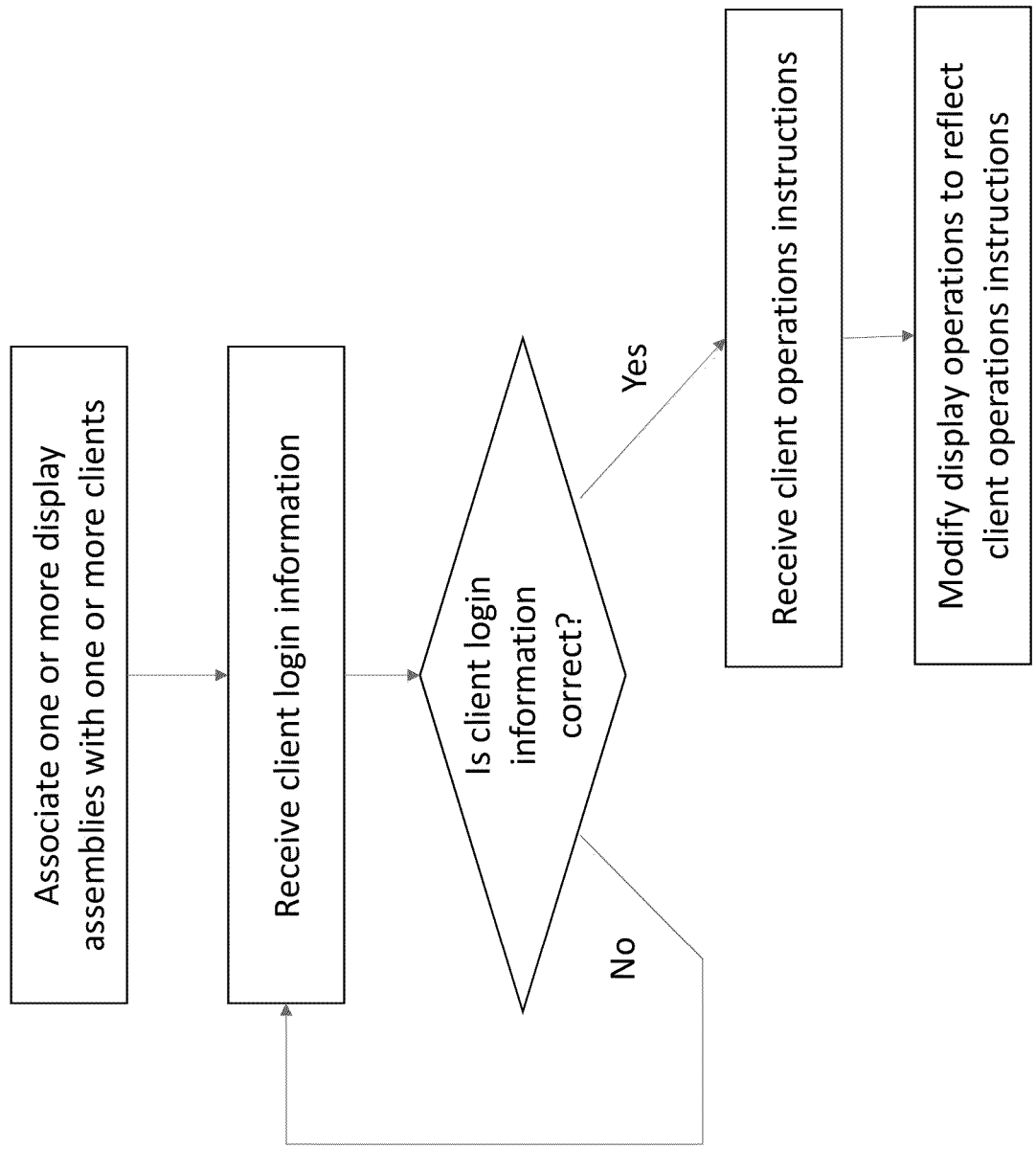
FIG. 6 is a flow chart of other exemplary logic for use with the system of FIG. 1.

FIG. 6 is a flow chart of other exemplary logic for use with the system of FIG. 1. One or more display assemblies 30 may be associated with one or more clients. A client login request may be received by way of one or more client devices 10 at the monitoring center 20. If the client login is not successful (e.g., if the user name and/or password are incorrect) the request may be denied. If the client login is successful (e.g., the user name and password are correct) the client may be permitted to remotely access one or more display assemblies 30 associated with the client. In exemplary embodiments, client login may be made by way of user name and password, one time use codes, biometric information, some combination thereof, or the like. Any method or system for verifying client identity is contemplated. Such access may be made by way of the monitoring center 20. The client may be able to view and retrieve operations data for the one or more display assemblies 30 associated with the client. The client may also be permitted to submit operation instructions for the one or more display assemblies 30 associated with the client. The operations of the one or more display assemblies 30 associated with the client may then be modified to reflect the received client operation instructions. Permissions may be tailored on a per client basis such that only certain display assemblies 30 may be accessed and/or modified when particular client login information is provided.

Figure 7:
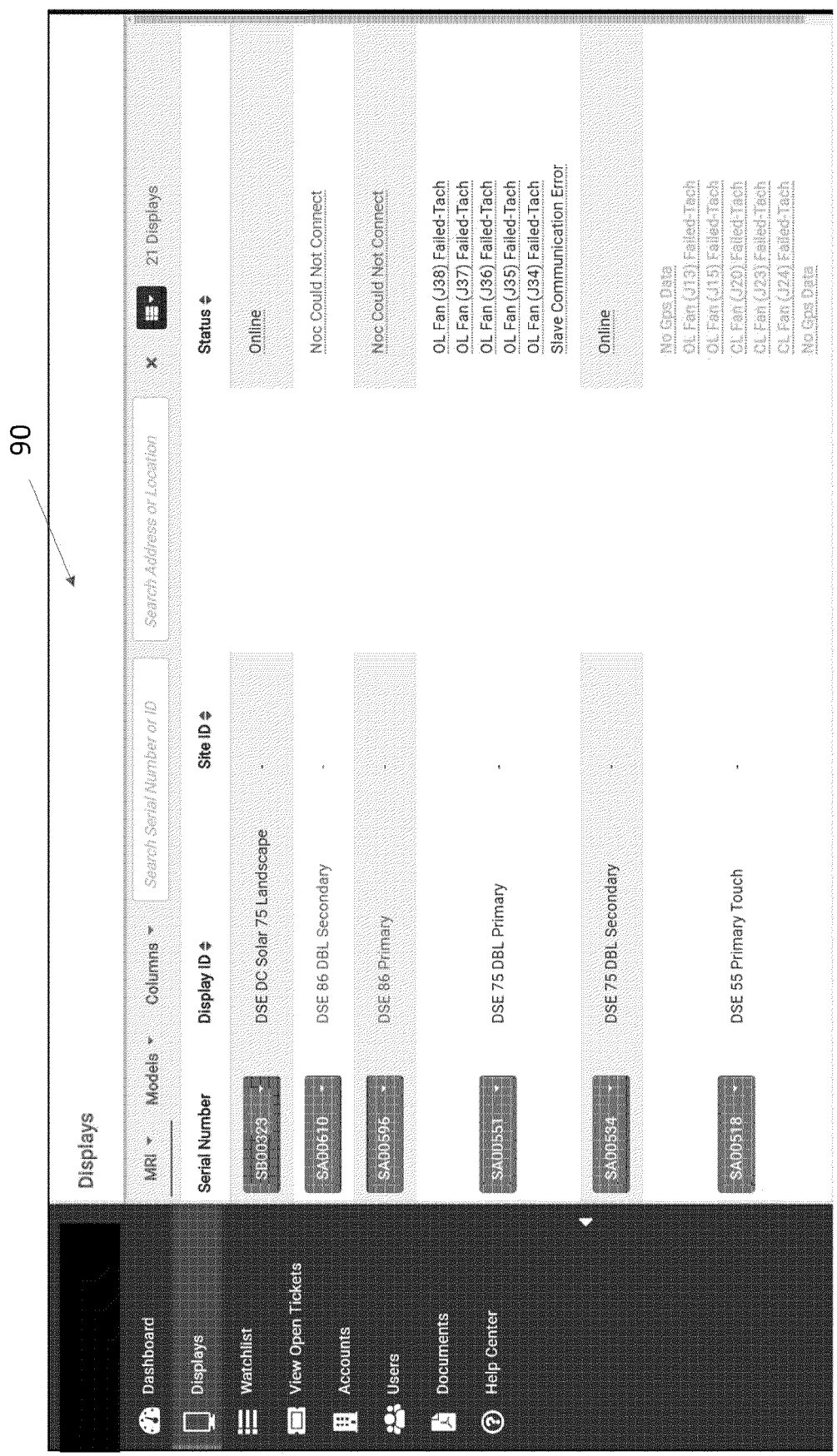
FIG. 7 is an exemplary user interface for use with the system of FIG. 1.

FIG. 7 is an exemplary user interface or report 90 for use with the system of FIG. 1. The user interface or report 90 may display overview information regarding a number of display assemblies 30, each of which may be associated with a particular client though such is not required. Information about each display assembly 30 may include, but is not limited to, the serial number, description information, site information, and status information of each display assembly 30. Status information, current and/or historical, may also be provided.

Figure 8:
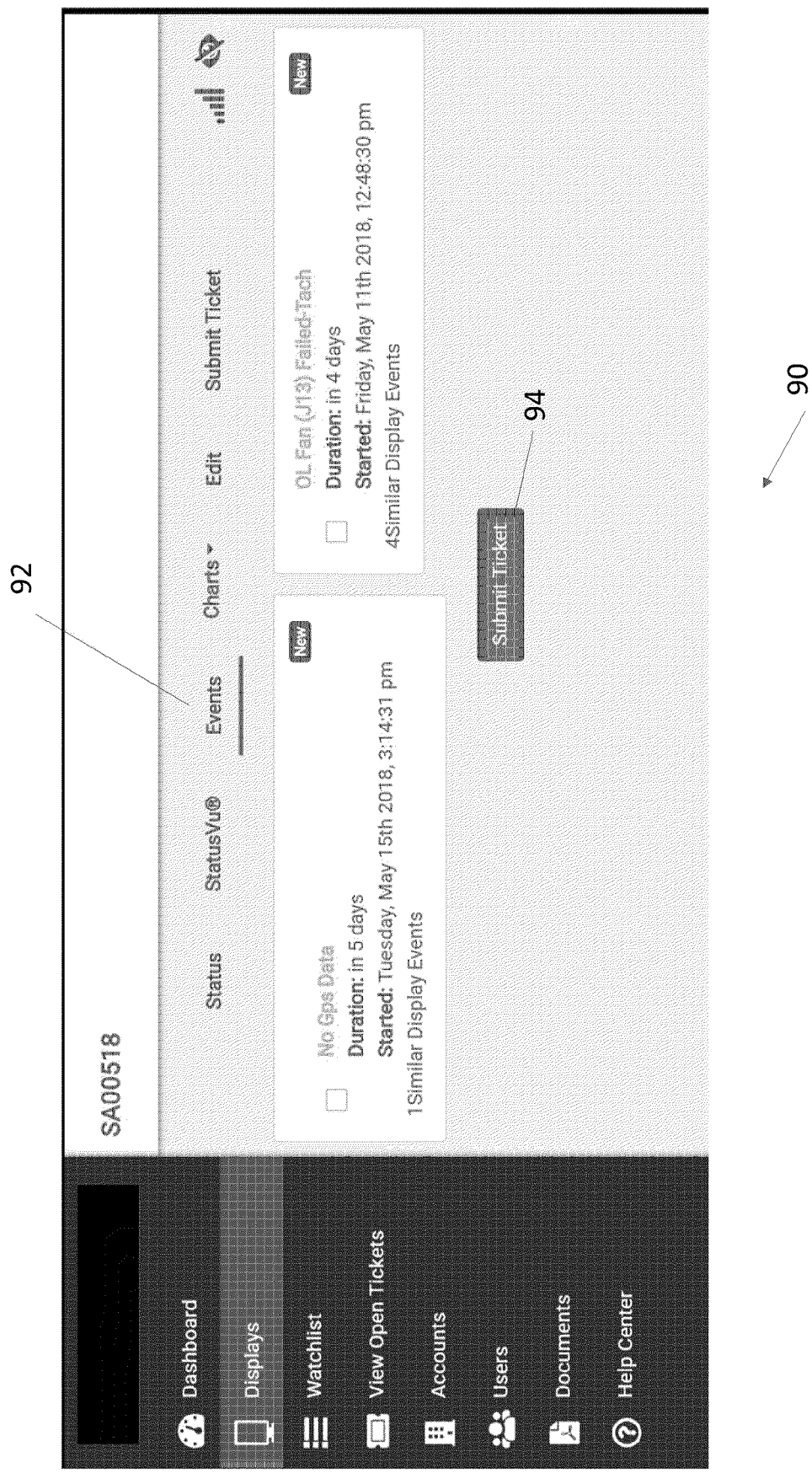
FIG. 8 is another exemplary user interface for use with the system of FIG. 1.

As shown in FIG. 8, event information for each of the display assemblies 30 associated with a particular client may be depicted under an events tab 92. The event information may include, but is not limited to, errors and warnings associated with one or more particular display assemblies 30. An option to automatically generate a repair request ticket 94 may be provided for each event.

Figure 9:
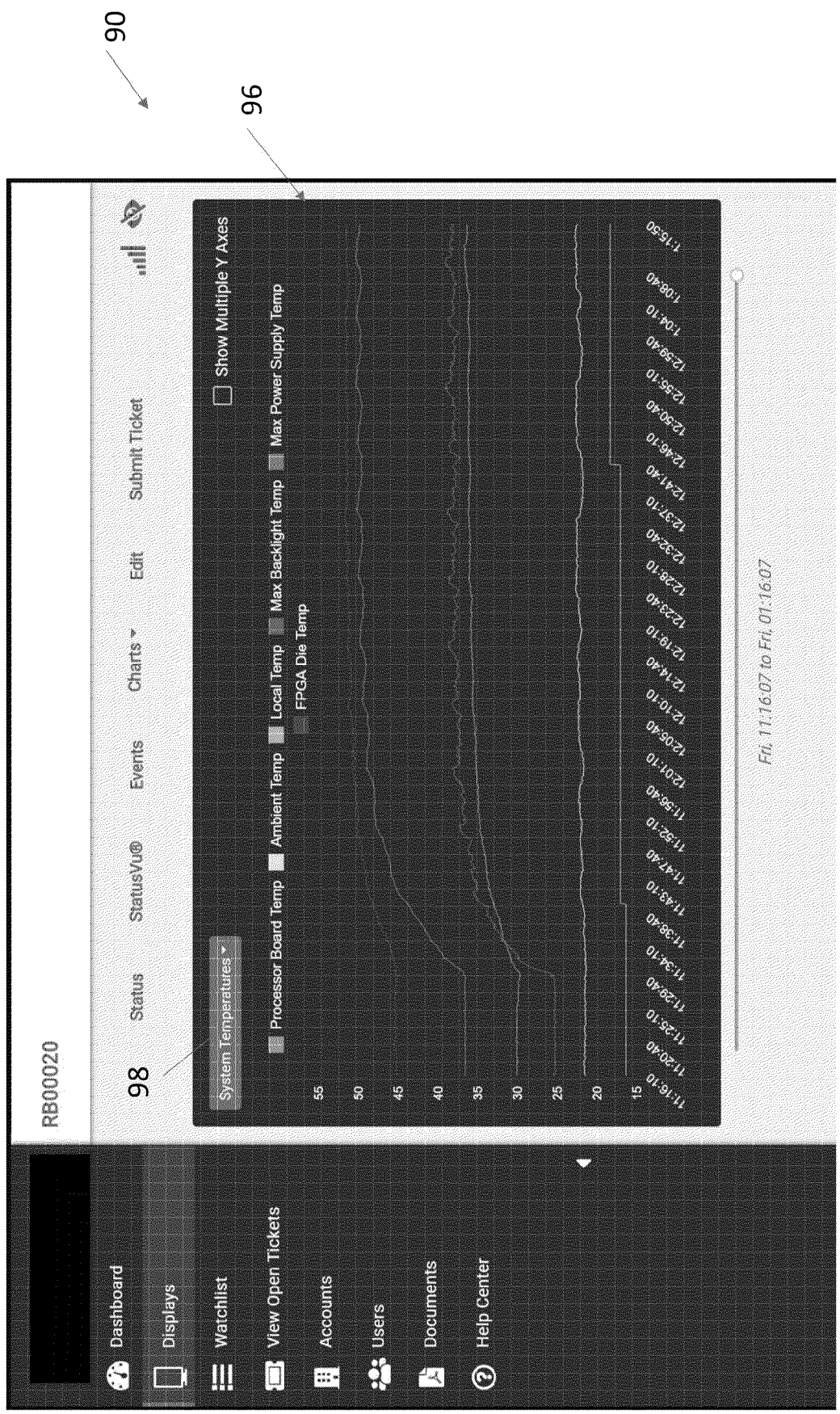
FIG. 9 is another exemplary user interface for use with the system of FIG. 1.

FIG. 9 is another exemplary user interface or report 90 for use with the system of FIG. 1. A visualization 96 of current and historical operations data may be displayed. Such operations data may comprise data from one or more sensors associated with a display assembly 30. In exemplary embodiments, the visualization 96 may be displayed in tabular form or a graphical representation such as, but not limited to, a line chart, bar chart, scatter diagram, or the like. Various categories of data may be depicted in the visualization 96 as selected by use of a menu 98. Such categories may be displayed in a color-coded fashion.

Figure 10:
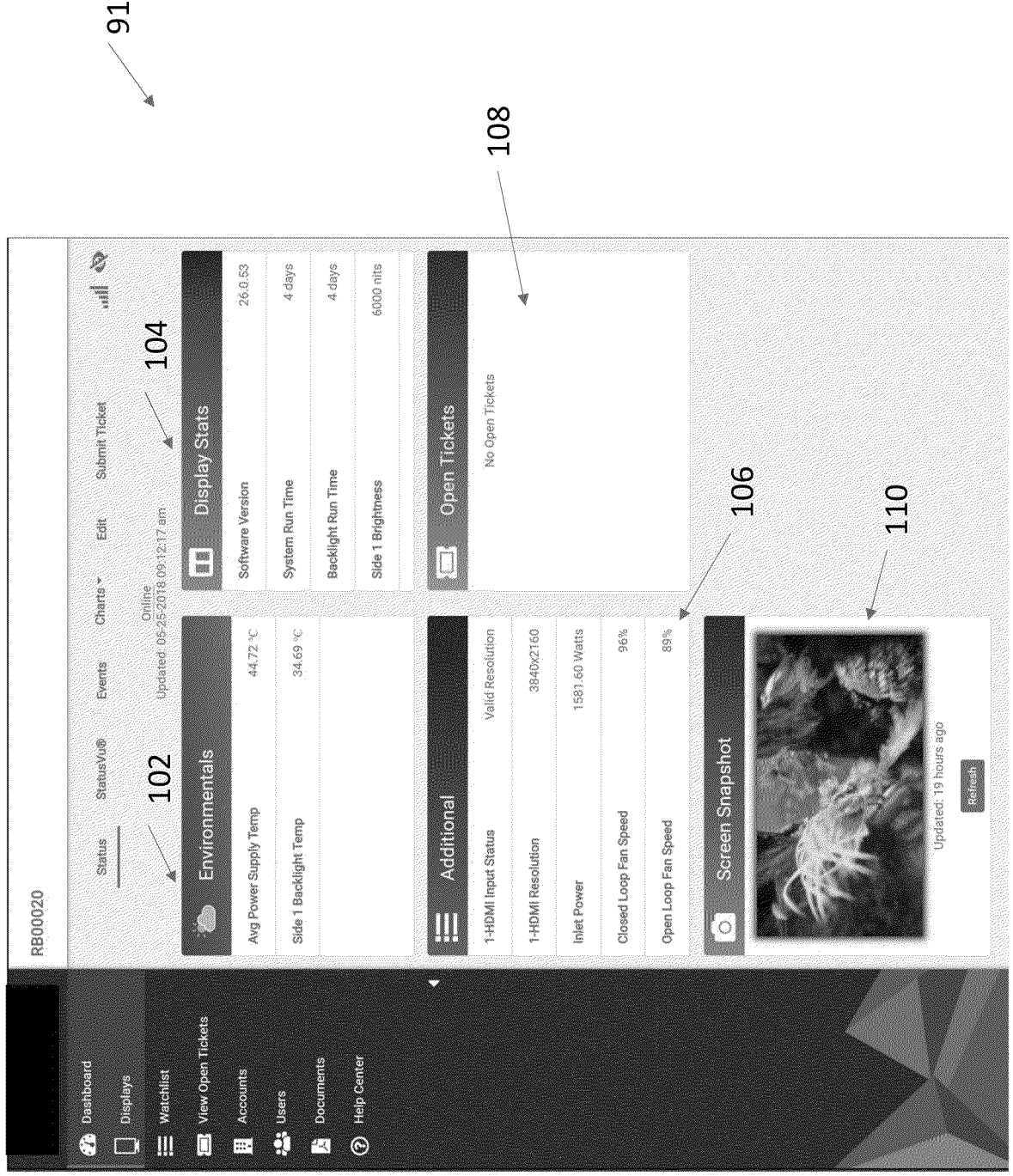
FIG. 10 is another exemplary user interface for use with the system of FIG. 1.

FIG. 10 is an exemplary summary dashboard 91, which may be configured to display summary information regarding a particular display assembly 30. Environmental information 102 may be displayed such as, but not limited to, the average power supply temperature and average backlight temperature. Display status information 104 may also be displayed such as, but not limited to, the software version, the system run time, the backlight run time, and the brightness of each display. Additional information 106 may also be displayed such as, but not limited to, the status and resolution of various inputs, the inlet power supply, and the fan speed of various fans in the display assembly 30. Any open repair request tickets may be displayed at an open ticket information area 108. A screen capture 110 of what is currently being displayed, was previously displayed, and/or is scheduled to be displayed next on the display assembly 30 may also be provided.

Figure 11:
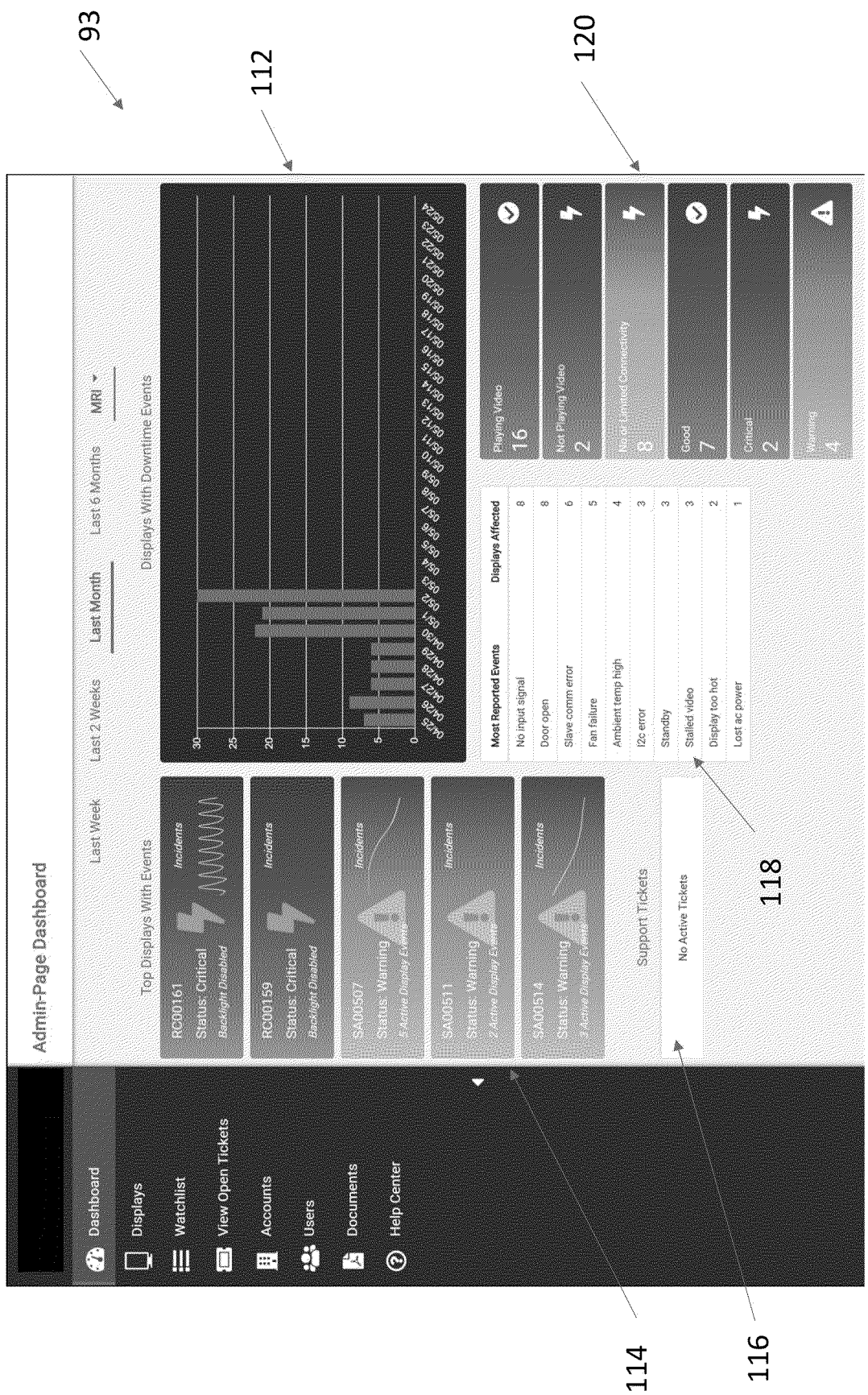
FIG. 11 is another exemplary user interface for use with the system of FIG. 1.

FIG. 11 is another exemplary summary dashboard 93, which may be configured to display summary information regarding all display assemblies 30 associated with a particular client identifier. The number of display assemblies 30 with some downtime event may be depicted in a downtime visualization 112. In exemplary embodiments, the downtime visualization 112 is a bar graph tracked by date, though any form of visualization is contemplated. A listing of top display assemblies with events 114 may be provided. A summary of repair ticket requests 116 may also be provided depicting all open repair ticket requests. A summary of the most reported events 118 may list the event(s) in question and the number of display assemblies 30 affected by the given event(s). The summary of the most reported events 118 may be presented in tabular form, though such is not required. Finally, a status summary 120 of all display assemblies 30 associated with a given client identifier may be provided. The status summary 120 may include, but is not limited to, the number of display assemblies 30 associated with the given client identifier which are playing video, not playing video, having no or limited network connectivity, in good condition, in critical condition, or having one or more warning events.

The information displayed and the manner in which it is displayed is merely exemplary and is not intended to be limiting. It is contemplated that any kind of data may be displayed in any format.

Figure 12B:
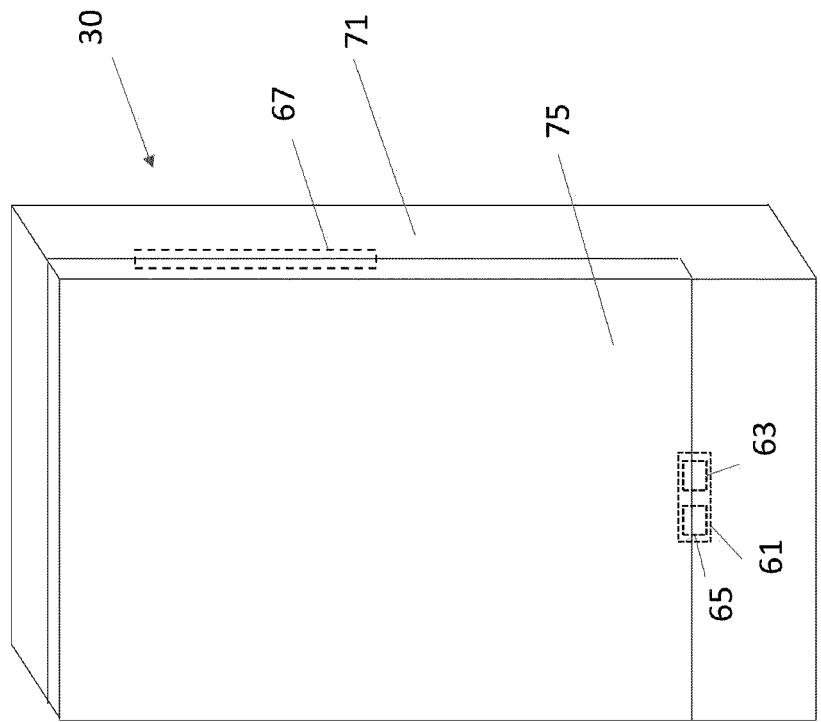
FIG. 12B is a rear perspective view of another exemplary display assembly for use with the system of at least FIG. 1.
Figure 12A:
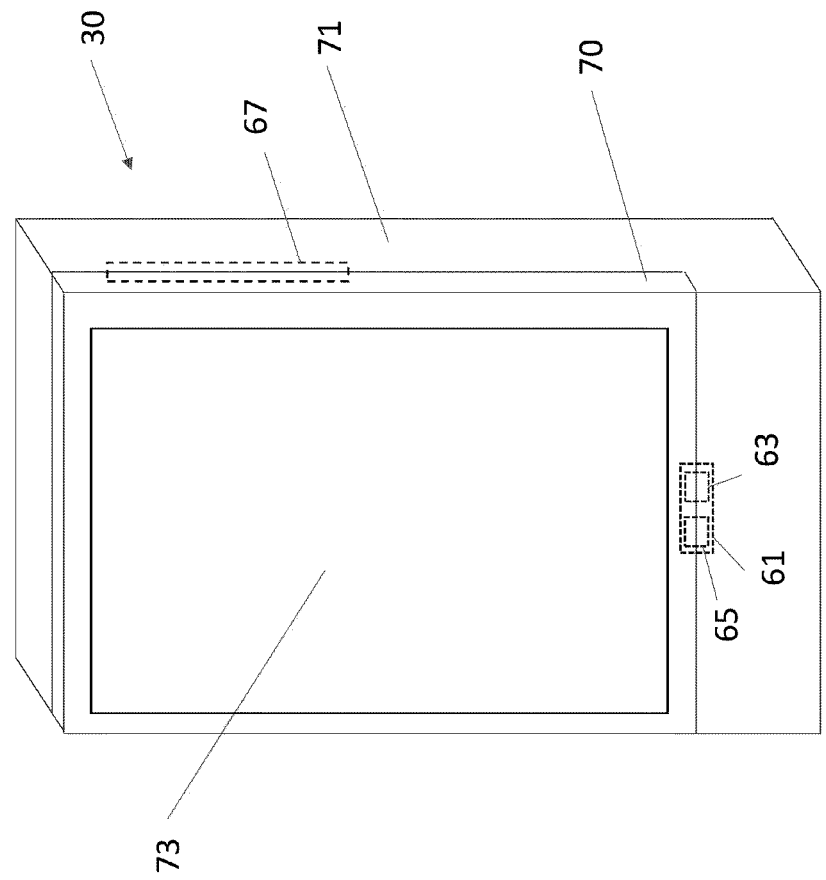
FIG. 12A is a front perspective view of another exemplary display assembly for use with the system of at least FIG. 1.

FIG. 12A through FIG. 12B illustrate exemplary display assemblies 30. The electronic displays 70 may be secured to a structural subassembly 71, though such is not necessarily required. The structural subassembly 71 may comprise one or more panels, housings, members, combinations thereof, or the like. The structural subassembly 71 may be configured for mounting to a ground surface (e.g., sidewalk, parking lot), wall, vehicle, combinations thereof, or the like. The structural subassembly 71 may comprise or provide a framework for mounting one or more of the electronic displays 70 and/or additional components of the display assemblies 10.

The electronic displays 70 may comprise one or more electronic display layers 73, such as but not limited to, liquid crystal layers, organic light emitting diodes, or the like. Any type or kind of electronic display may be utilized. The electronic display layers 73 may be set within a housing, behind a cover layer, within a framework of members, combinations thereof, or the like. The electronic displays 70 and/or the electronic display layers 73 may be provided in any size and/or shape.

A single one or multiple ones of the electronic displays 70 may be secured to any given one of the structural subassemblies 71.

The electronic displays 70 may be moveably secured to the structural subassemblies 71, though such is not necessarily required. For example, without limitation, the electronic displays 70 may be configured for rotational movement between a closed position and an opened position. In exemplary embodiments, without limitation, an upper portion or edge of the electronic displays 70 may be secured to the structural subassembly 71 in a hinged fashion. The closed position may include securing a bottom or other edge of the electronic display 70 to the structural subassembly 71. Alternatively, or additionally, a rear surface of the electronic display and/or interior of the structural assembly 71 may be wholly and/or substantially inaccessible while the electronic displays 70 are in the closed position. The opened position may include rotating the bottom edge or other edge of the electronic display 70 away from the structural subassembly 71. Alternatively, or additionally, the rear surface of the electronic display 70 and/or interior of the structural subassembly 71 may be wholly, partially, and/or substantially accessible while the electronic displays 70 are in the opened position. The electronic displays 70 may be configured for movement along a vertical axis, horizontal axis, or the like. The electronic displays 70 may be hinged or configured for movement along an upper edge, lower edge, side edge, combinations thereof, or the like.

Where multiple electronic displays 70 are utilized (e.g., back-to-back units), some or all of the multiple electronic displays 70 may be configured for movement.

Alternatively, or additionally, as illustrated with particular regard to FIG. 12B, the display assemblies 30 may comprise one or more access panels 75. The access panels 75 may comprise doors. Movement of the access panels 75 into the opened position may permit access to the rear surface of the electronic display 70 and/or interior of the structural subassembly 71, by way of non-limiting example. Movement of the access panels 75 into the closed position may prevent or inhibit access to the rear surface of the electronic display 70 and/or interior of the structural subassembly 71, by way of non-limiting example. Access panels 75 may be utilized with single-sided units, by way of non-limiting example. For example, without limitation, access panels 75 may be connected to an opposing side of the structural assembly 71 compared to an electronic display 70, though such is not required. The access panels 75 may comprise blank covers (e.g., sheet metal, printed glass, combinations thereof, or the like), poster cavities (illuminated or otherwise), combinations thereof, or the like. The access panels 75 may be moveably secured to the structural subassembly 71, though such is not necessarily required.

Some or all of the display assemblies 30 may comprise one or more latching devices 61. The latching devices 61 may be configured to selectively secure the electronic displays 70 and/or access panels 75 of the display assemblies 30 in the closed position, such as when the latching devices 61 are in a latched configuration, for example without limitation. When in an unlatched configuration, the latching devices 61 may permit movement of the electronic displays 70 and/or access panels 75 of the display assemblies 30 into the opened position.

The latching devices 61 may be configured for manual and/or electronic actuation. For example, without limitation, the latching devices 61 may comprise one or more handles, buttons, levers, gears, hooks, catches, combinations thereof, or the like for manual and/or local operation. Alternatively, or additionally, the latching devices 61 may comprise one or more motors, solenoids, actuators, magnets, cams, shafts, pins, tumblers, combinations thereof, or the like and/or may be in electronic communication with the controller 50 for electronic and/or remote operation. Any type and/or kind of latching device 61 may be utilized.

The latching devices 61 may comprise locking devices 63. The locking devices 63 may be configured for movement between a locked position and an unlocked position. For example, without limitation, when in the locked position, the locking devices 63 may be configured to prevent the latching devices 61 from moving into the unlatched position, such as to prevent movement of the electronic displays 70 and/or access panels 75 from the closed position into the opened position. As another example, without limitation, when in the unlocked position, the locking devices 63 may be configured to permit the latching devices 61 to move into the unlatched position, such as to permit movement of the electronic displays 70 and/or access panels 75 from the closed position into the opened position.

The latching devices 61 and/or locking devices 63 may be configured for any type or kind of user interaction, such as but not limited a key access, combination access, biometric access, combinations thereof, or the like. Any type and/or kind of locking device 63 may be utilized.

The latching devices 61 may be located along a lower edge of the display assembly. However, any location of the latching devices 61 may be used, such as to permit rotation of the electronic displays 70 and/or access panels 75 in a given direction.

The latching devices 61 may comprise one or more switches 65, such as micro-switches, sensors (e.g., optical sensors, pressure sensors, switches), locking devices 63, latches, actuators, buttons, handles, combinations thereof, or the like. The status of the latching devices 61 may be periodically monitored and/or updated. The latching devices 61 may be remotely operated, such as but not limited to, between a locked and unlocked position and/or latched and unlatched positions.

In exemplary embodiments, without limitation, the latching devices 61 may comprise one or more switches 65, and/or such switches 65 may be separately provided. The switches 65 may be located to detect movement of the electronic displays 70 and/or access panels 75 between the opened and/or closed positions. For example, without limitation, the switches 65 may be interposed between the electronic displays 70 and the structural subassembly 71. Alternatively, or additionally, such switches 65 may be physically or electronically connected to said latching devices 61, such as to detect status of the locking devices and/or latching devices (e.g., locked or unlocked positioned, latched and/or unlatched position). In this fashion, the status of the electronic displays 70 and/or access panels 75 may be remotely monitored (e.g., if in locked position, unlocked position, opened position, and/or closed position) and/or operated (e.g., moved between locked and unlocked positions, and/or opened and closed positions).

The latching devices 61 may be one of the components 60 and/or in electronic communication with the controller 50, by way of non-limiting example. Alternatively, or additionally, the latching devices 61 and/or components thereof may be separately provided.

The display assemblies 30 may comprise one or more movement assistance devices 67. The movement assistance devices 67 may comprise, for example without limitation, gas springs, motors, gears, levers, or the like. The movement assistance devices 67 may be manually and/or electronically operated. The movement assistance devices 67 - may be one of the components 60 and/or in electronic communication with the controller 50, by way of non-limiting example. Alternatively, or additionally, the movement assistance devices 67 may be separately provided. The movement assistance devices 67 may be locally and/or manually operated and/or operated remotely, such as for moving the electronic displays 70 and/or access panels 75 between the locked and unlocked positions and/or opened and closed positions.

The latching devices 61 may be interposed between the electronic displays 70 and/or access panels 75 and the structural subassembly 71, and/or be connected in whole or in part to one or both thereof.

Figure 13:
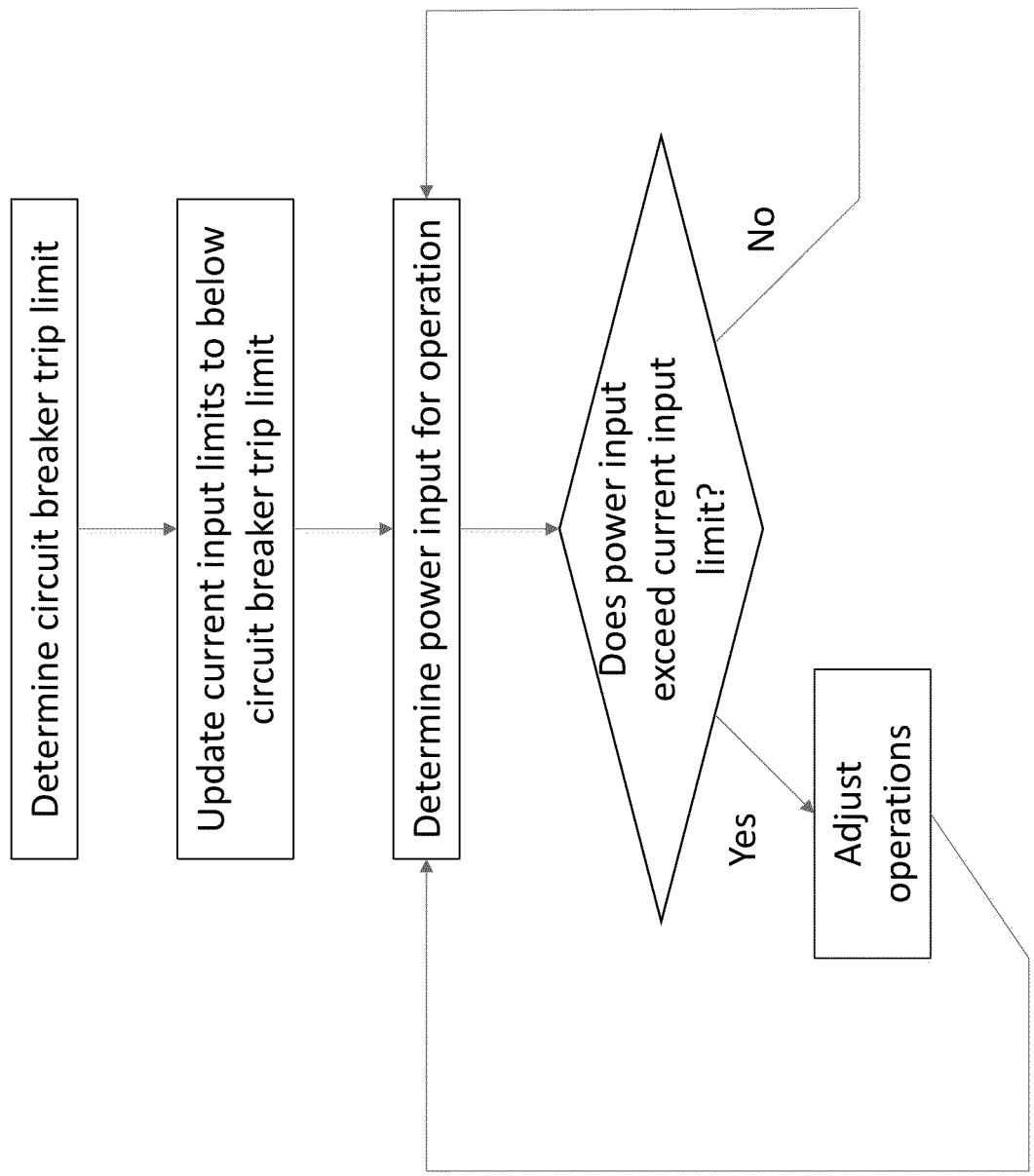
FIG. 13 is a flow chart with exemplary logic for use with the system of at least FIG. 1.

FIG. 13 illustrates a flow chart for remotely establishing power limits, such as but not limited to alternating current ("AC") power input limits by way of non-limiting example. Direct current ("DC") power input limits may alternatively or additionally be used. FIG. 14 illustrates an exemplary display assembly 30 with power consumption limiting features.

One or more power lines 82 may electrically connect one or more external power sources 88 to the display assembly 30. The external power sources 81 may comprise a utility power supply, solar panels, batteries, bulk energy storage devices, alternators, generators, power plants, combinations thereof, or the like. The display assembly 30 may comprise one or more circuit breakers 84. The circuit breakers 84 may be electrically interposed between some or all of the external power source(s) 81 and some or all of the electricity consuming components of the display assembly 30, such as but not limited to the electronic displays 70 and components 60. The circuit breakers 84 may be internal to and/or external to the display assembly 30.

Trip limits of the circuit breakers 84 may be determined. Such trip limits may be determined manually. For example, without limitation, the known trip limits may be electronically inputted at one or more of the interfaces 90. The trip limits may be set by voltage rating, frequency rating, current rating, breaking capacity, making capacity, operating sequency, short-circuit current rating, short-circuit withstand rating, combinations thereof, or the like. Any number, type, kind, and/or arrangement of the circuit breakers 84 may be utilized.

AC current input limits, or other power limits, for the display assembly 30 may be set to below the circuit breaker 84 trip limit, such as to prevent or limit nuisance trips of power breakers. The power limits may be set to a predetermined amount below the trip limit in exemplary embodiments, without limitation. For example, without limitation, if a user inputs a breaker trip limit of 20 amps, such as may be identified at one or more of the interfaces 90, the power limit may be automatically set to 18 amps. Any predetermined amount may be utilized.

The display assembly 30 may comprise power monitoring equipment 86. Such power monitoring equipment 86 may comprise one or more actual or simulated electric meters, or the like. The power monitoring equipment 86 may be part of, or in electronic communication with, the controller 50. Such simulated electric meters may be and/or operate as shown and/or described in U.S. Pub. No. 2019/0339312 published Nov. 7, 2019, the disclosures of which are hereby incorporated by reference, by way of non-limiting example.

The controller 50 may be configured to limit power input to, at, or below the power input limit, by way of non-limiting example. The controller 50 may be configured to monitor power consumption, such as but not limited to by way of the power monitoring equipment 86. As the power consumption approaches (e.g., is within a predetermined margin of) and/or reaches or exceeds the power input limit, the controller 50 may be configured to adjust operations of the display assembly 30, such as to adjust the power consumption to a level at, below, or within a tolerance of, the power input limit.

For example, without limitation, the controller 50 may be configured to automatically adjust operations of the display assembly 30 to reduce power draw. For example, without limitation, the electronic displays 70 may be operated at reduced to zero illumination, fan speed may be reduced, peripheral devices may be deactivated, combinations thereof, or the like. Alternatively, or additionally, the controller 50 may be configured to automatically adjust power routing, such as through different electric pathways, such as to adjust current, voltage, amperage, wattage, amp-hours, combinations thereof, or the like, disconnecting certain power supplies, disconnecting certain power consuming equipment, inactivating certain power consuming equipment, adjusting certain power consuming equipment, combinations thereof, or the like.

Figures 15, 16:
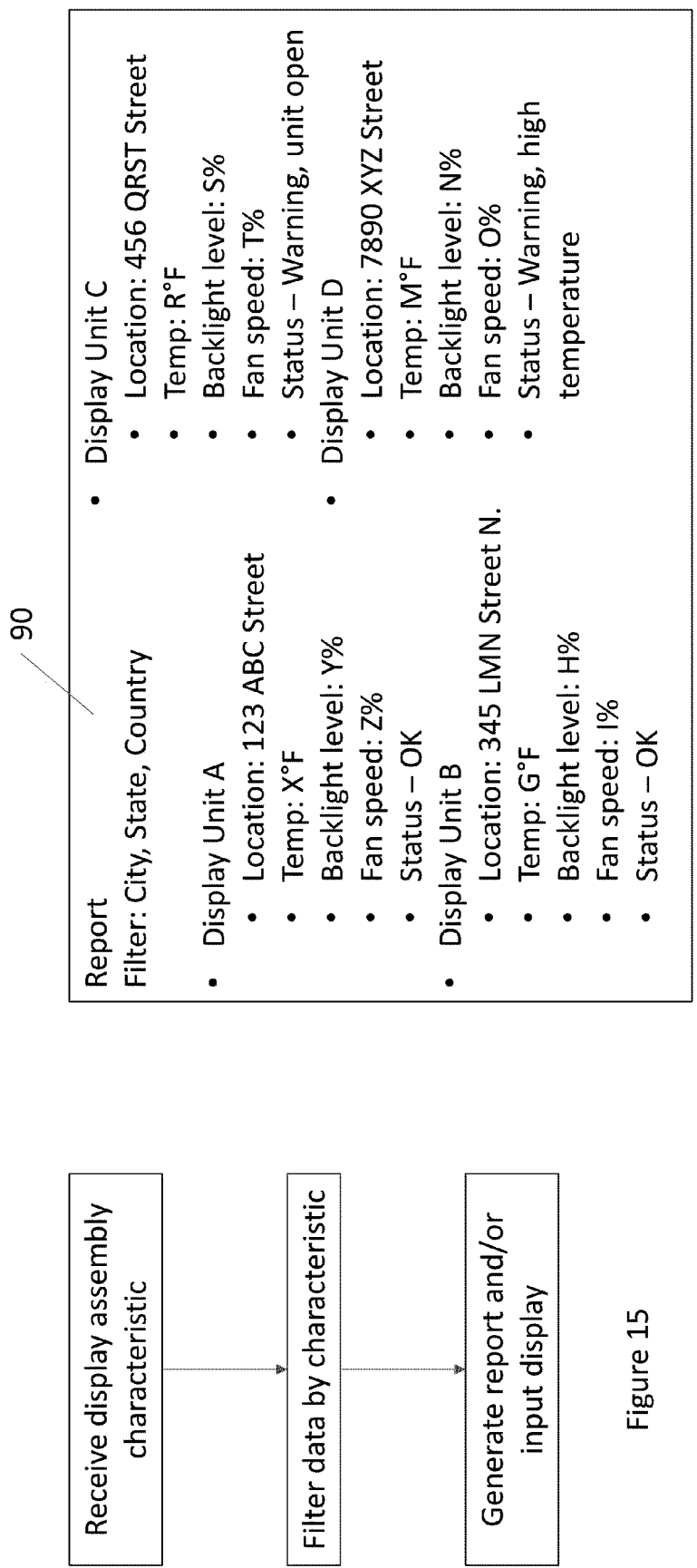
FIG. 15 is a flow chart with exemplary logic for use with the system of at least FIG. 1.
FIG. 16 is a plan view of an exemplary report generatable by at least the system of FIG. 1 and the method of FIG. 15.

FIG. 15 illustrates a flow chart for remotely monitoring and/or adjusting various data points for the display assemblies 30. Data points may include, but are not necessarily limited to, daytime brightness level, nighttime brightness level, brightness transition (e.g., from day-to-night and/or night-to-day), autonomous peripheral power cycling and under what conditions, autonomous media player reboots and under what conditions, combinations thereof, or the like.

The various data points may be remotely monitored and/or updated. The data points may be viewed and/or updated based on various display assembly 30 characteristics, including but not necessarily limited to, deployed geographic region (e.g., zip code, city, within distance from particular location, state, province, country, combinations thereof, or the like), part number, unit serial number, fleet, customer identifier, advertisement identifier, combinations thereof, or the like.

FIG. 16 illustrates an exemplary report 90 filtered by an exemplary geographic region. The type and arrangement of data is merely exemplary and is not intended to be limiting. The interfaces or report 90 may be generated with only the data points relevant to the selected characteristic(s). In this fashion, a user may not only see only the content relevant to their display assemblies 30, but this content may be further filtered by various characteristics. This may be used to only provide relevant data in reporting and/or relevant settings for adjustment.

Figure 17:
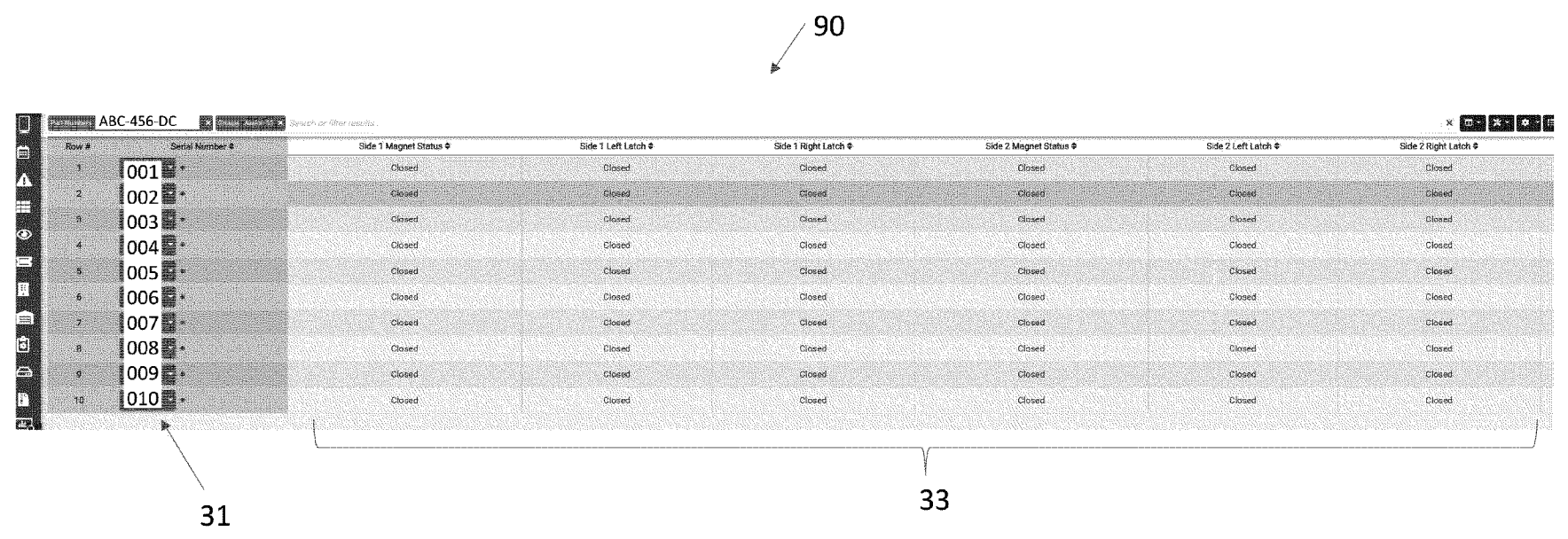

FIG. 17 illustrates an exemplary report 90 filtered by status of the latching devices 61, electronic displays 70, and/or access panels 75. Identifying information for the display assemblies 30 may be provided at item 31, and status information for the latching devices 61, electronic displays 70, and/or access panels 75 may be provided at item 33.

The type, kind, and/or arrangement of data and options shown in the interfaces or reports 90 shown and/or described herein is merely exemplary and is not intended to be limiting. Any type, kind, and/or arrangement of data and options may be provided. The data points shown and/or described may be manipulated, processed, and/or visualized in various ways.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means. The electronic devices, including but not necessarily limited to the electronic storage devices, databases, or the like, may comprise and/or be configured to hold, solely non-transitory signals.

What is claimed is:

1. A system for remote monitoring of display assemblies, said system comprising:
   the display assemblies, each comprising:
      one or more electronic displays;
      one or more components for operating a respective one of the display assemblies;
      a controller in electronic communication with each of the one or more electronic displays and the one or more components; and
      a network connection device in electronic communication with the controller; and
   a monitoring center, remote from the display assemblies, and comprising one or more non-transitory electronic storage devices comprising software instructions, which when executed, configure one or more processors to:
      receive, from the display assemblies, data regarding operations of the display assemblies;
      associate different customer identifiers with different portions of the data;
      receive a particular customer identifier from a customer device; and
      identify the portions of the data associated with the particular customer identifier for transmission to the customer device.

2. The system of claim 1 wherein:
   each of said display assemblies comprise a structural subassembly;
   said one or more electronic displays of said display assemblies are movably connected to the structural subassemblies; and
   said one or more components of said display assemblies comprise:
      latches located along edges of the one or more electronic displays to facilitate movement of said one or more electronic displays between a closed position and an opened position;
      locking devices configured to selectively secure said one or more electronic displays in said closed position; and
      switches located between said one or more electronic displays and the structural subassemblies for detecting movement of said one or more electronic displays into said opened position.

3. The system of claim 1 wherein:
   said one or more components comprise locking devices, latches, or microswitches.

4. The system of claim 1 wherein:
   said one or more components comprise one or more of: fans, temperature sensors, light sensors, fan speed sensors, power consumption sensors, air quality sensors, weather sensors, telephone equipment, video conferencing equipment, voice-over-internet-protocol equipment, touch screens, camera, microphones, emergency notification devices, wayfinding equipment, location detection devices, video players, and proof of play devices.

5. The system of claim 1 wherein:
said one or more components comprise sensors at the display assembly; and
said data comprises one or more of fan speed, ambient temperature readings, internal temperature readings, ambient light levels, backlight levels, and power consumption information for the display assembly.

6. The system of claim 5 wherein:
said one or more non-transitory electronic storage devices comprise additional software instructions, which when executed, configure said one or more processors to generate time dependent graphs of the data from the sensors.

7. The system of claim 1 wherein:
said one or more non-transitory electronic storage devices comprise additional software instructions, which when executed, configure said one or more processors to:
receive user input regarding one or more display characteristics;
filter said data by said one or more display characteristics; and
generate a report with the filtered data.

8. The system of claim 7 wherein:
said display characteristics comprise a geographic area.

9. The system of claim 1 wherein:
association of said different customer identifiers with the different portions of said data received at said monitoring center from said display assembly, reception of said particular customer identifier from a customer device, and identifying the portions of the data associated with the particular customer identifier for transmission to the customer device is accomplished using micro-services.

10. The system of claim 1 wherein:
the data is electronically compartmentalized by the customer identifiers; and
said one or more non-transitory electronic storage devices comprise additional software instructions, which when executed, configure said one or more processors to:
receive and verify login information from the customer device; and
summarize all of the portions of the data assigned the particular one of the customer identifiers into a summary report.

11. The system of claim 1 wherein:
at least some of said data received from a particular one of said display assemblies is associated with multiple ones of said customer identifiers; and
said monitoring center comprises a dedicated physical facility.

12. The system of claim 1 wherein:
said one or more non-transitory electronic storage devices comprise additional software instructions, which when executed, configure said one or more processors to:
receive operating instructions for the display assemblies; and
transmit said operating instructions to the display assemblies for implementation.

13. The system of claim 12 wherein:
said operation instructions comprise one or more of fan speed instructions and backlight level instructions.

14. The system of claim 12 wherein:
said operation instructions comprise a power input limit; and
said controllers are configured to:
monitor power consumption of a respective one of the display assemblies; and
adjust operations of the respective one of the display assemblies to maintain said power consumption of the respective one of the display assemblies at or below said power input limit.

15. The system of claim 14 wherein:
said controllers are configured to reduce a backlight level of the respective one of the display assemblies or decrease a fan speed of the respective one of the display assemblies where said power consumption of the respective one of the display assemblies exceeds said power input limit;
each of said display assemblies is associated with one or more circuit breakers, each having a trip limit; and
said power input limits are set below the trip limits for respective one or more of said one or more circuit breakers of each of said display assemblies.

16. A method for remote monitoring of display assemblies, said method comprising:
electronically associating different customer identifiers with different portions of data electronically received from the display assemblies regarding operations of the display assemblies, wherein said data comprises data received from one or more sensors provided at each of the display assemblies;
electronically receiving a particular customer identifier from a customer device; and
electronically identifying the portions of the data associated with the particular customer identifier for transmission to the customer device.

17. The method of claim 16 further comprising:
receiving and verifying login information from the customer device;
receiving one or more filter criteria;
filtering said data by way of said one or more filter criteria;
summarizing all of the portions of the filtered and identified data into a summary report; and
electronically presenting the summary report at the customer device.

18. The method of claim 16 wherein:
the data is received from sensors at the display assemblies and comprises fan speed, ambient temperature readings, internal temperature readings, ambient light levels, backlight levels, and power consumption information for the display assemblies; and
at least some of the data received from a particular one of the display assemblies is associated with multiple ones of the customer devices.

19. The method of claim 16 further comprising:
electronically receiving operating instructions for the display assemblies;
electronically transmitting said operating instructions to the display assemblies; and
electronically implementing, at the display assemblies, the operating instructions.

20. A system for providing customer-specific status information for display assemblies utilized by multiple different customers, said system comprising:
the display assemblies, each respective one of the display assemblies being configured for utilization by multiple customers and comprising:
a structural subassembly;
one or more electronic displays mounted to said structural subassembly;
components for operating the respective one of the display assemblies;
sensors for monitoring operating conditions of the respective one of the display assemblies;

a controller in electronic communication with each of the one or more electronic displays, the components, and the sensors; and a network connection device in electronic communication with the controller;

a network operations center, remote from the display assemblies, and comprising one or more non-transitory electronic storage devices comprising software instructions, which when executed, configure one or more processors to:

receive, from each of the display assemblies, data regarding operational status of each of the display assemblies;

associate different customer identifiers with different portions of said data received at said network operations center from each of said display assemblies such that at least some of the portions of the data received from each respective one of the display assemblies is associated with different ones of the customer identifiers;

receive a particular customer identifier from a customer device;

identify the portions of the data associated with the particular customer identifier for transmission to the customer device;

receive user input regarding one or more display characteristics;

filter said identified data by said one or more display characteristics;

generate a report with the filtered, identified data;

monitor power consumption of the display assemblies; and where said monitored power consumption of a respective one of the display assemblies meets or exceeds a predetermined threshold, automatically commanding adjusting of operation of said respective one of the display assemblies to decrease power consumption.

* * * * *